(12) United States Patent
Stang et al.

(10) Patent No.: US 11,910,074 B2
(45) Date of Patent: Feb. 20, 2024

(54) HOUSING OF AN IMAGE CAPTURING DEVICE

(71) Applicant: Hand Held Products, Inc., Fort Mill, SC (US)

(72) Inventors: Jean-Pierre Stang, Charlotte, NC (US); Xiaoyan Bo, Charlotte, NC (US); Yang Zhang, Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 226 days.

(21) Appl. No.: 17/447,644

(22) Filed: Sep. 14, 2021

(65) Prior Publication Data
US 2022/0086313 A1 Mar. 17, 2022

(30) Foreign Application Priority Data
Sep. 16, 2020 (CN) .......................... 202010975621.7

(51) Int. Cl.
*G02B 7/02* (2021.01)
*H04N 23/51* (2023.01)
*G02B 7/04* (2021.01)
*H04N 23/54* (2023.01)

(52) U.S. Cl.
CPC ............. *H04N 23/51* (2023.01); *G02B 7/025* (2013.01); *G02B 7/04* (2013.01); *H04N 23/54* (2023.01)

(58) Field of Classification Search
CPC ........ H04N 23/51; H04N 23/54; H04N 23/55; G02B 7/025; G02B 7/04; G03B 17/02

USPC .......................................................... 359/704
See application file for complete search history.

(56) References Cited

U.S. PATENT DOCUMENTS

| | | | |
|---|---|---|---|
| 10,663,714 B2 | 5/2020 | Ofir et al. | |
| 10,948,685 B2* | 3/2021 | Hubert | H04N 23/55 |
| 2018/0364441 A1* | 12/2018 | Hubert | H04N 23/57 |
| 2020/0124818 A1 | 4/2020 | Hubert et al. | |
| 2021/0199913 A1* | 7/2021 | Hubert | H04N 23/57 |

FOREIGN PATENT DOCUMENTS

AU 2019283800 B2 2/2021

OTHER PUBLICATIONS

European Search Report and Search Opinion received for EP Application No. 21196118.0, dated Feb. 1, 2022, 7 pages.

* cited by examiner

*Primary Examiner* — William R Alexander
(74) *Attorney, Agent, or Firm* — Alston & Bird LLP

(57) ABSTRACT

Various embodiments illustrated herein disclose a housing of an imaging unit. The housing comprising an outer surface and an inner surface, wherein the inner surface of the housing defines a lens channel, wherein the inner surface of the lens channel defines a contact point that protrudes outwardly from the inner surface into the lens channel. The inner surface of the lens channel further defines a through hole, in the lens channel, that extends from the inner surface of the lens channel to the outer surface of the housing. The lens channel is configured to receive a lens barrel comprising a groove, wherein the groove is exposed to the through hole when the lens barrel is received in the lens channel.

20 Claims, 7 Drawing Sheets

HOUSING OF AN IMAGE CAPTURING DEVICE

CROSS-REFERENCE TO RELATED APPLICATIONS

This application claims priority pursuant to 35 U.S.C. 119(a) to China Patent Application No. 202010975621.7, filed Sep. 16, 2020, which application is incorporated herein by reference in its entirety.

TECHNOLOGICAL FIELD

Exemplary embodiments of the present disclosure relate generally to an image capturing device and, more particularly, to a housing of an imaging unit in the image capturing device.

BACKGROUND

Typically, image capturing devices, such as but not limited to, cameras, barcode scanners, and imagers, include an imaging unit that is configured to capture images of an object. The imaging unit further includes a housing, an image sensor and a lens barrel. The housing may be configured to receive the image sensor and the lens barrel in such a manner that ambient light passes through the lens barrel and is focused on the image sensor. In order to ensure that the light from the lens barrel focuses on the image sensor, the lens barrel and the image sensor need to be aligned with each other.

BRIEF SUMMARY

Various embodiments illustrated herein disclose an image capturing device. The image capturing device comprises an imaging unit that further includes a housing that comprises an inner surface. The inner surface of the housing defines a lens channel, wherein the inner surface of the lens channel defines a contact point that protrudes outwardly from the inner surface into the lens channel. Further inner surface defines a through hole, in the lens channel, which extends from the inner surface of the lens channel to an outer surface of the housing. The image capturing device further includes a lens barrel received in the lens channel, the lens barrel comprising an outer surface that defines a first portion, a first platform that circumferentially rotates about a first central longitudinal axis of the lens barrel, wherein a first step is defined at a junction between the first platform and the first portion. The lens barrel further defines a groove defined on the first platform, wherein the groove circumferentially rotates about the first central longitudinal axis of the lens barrel, wherein when the first step abuts the contact point, the groove is exposed via the through hole.

Various embodiments illustrated herein disclose a housing of an imaging unit. The housing comprising an outer surface and an inner surface, wherein the inner surface of the housing defines a lens channel, wherein the inner surface of the lens channel defines a contact point that protrudes outwardly from the inner surface into the lens channel. The inner surface of the lens channel further defines a through hole, in the lens channel, that extends from the inner surface of the lens channel to the outer surface of the housing. The lens channel is configured to receive a lens barrel comprising a groove, wherein the groove is exposed to the through hole when the lens barrel is received in the lens channel.

Various embodiments illustrated herein disclose a lens barrel that includes a housing having an outer surface. The outer surface defines a first portion, and a first platform that circumferentially rotates about a first central longitudinal axis of the lens barrel, wherein a first step is defined at a junction between the first platform and the first portion. Further, outer surface defines a groove defined on the first platform, wherein the groove circumferentially rotates about the first central longitudinal axis of the lens barrel. When the first step abuts a contact point defined in a lens channel in an imaging unit, the groove is exposed via a through hole defined in the imaging unit.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
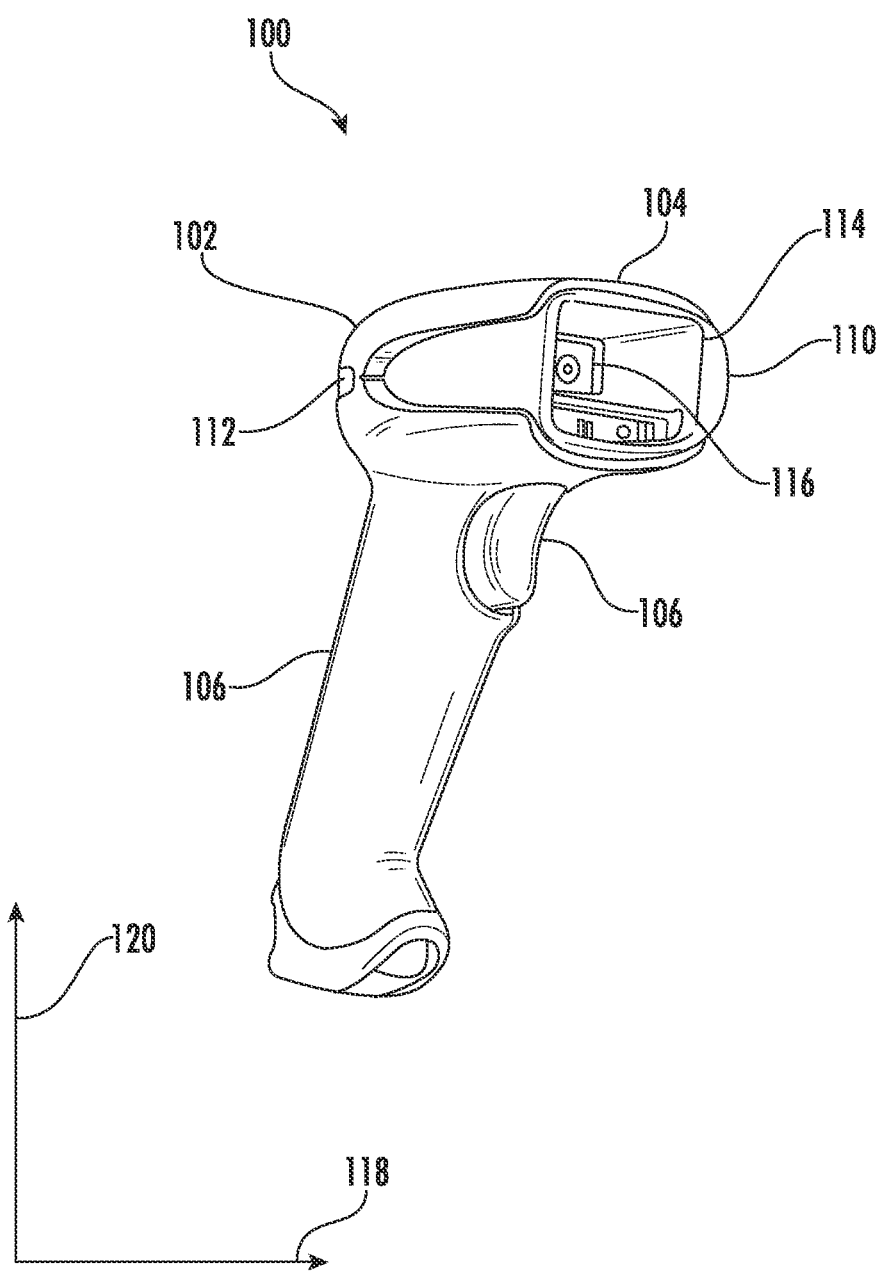
FIG. 1 illustrates a perspective view of an image capturing device, according to one or more embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," and the like generally mean that the particular feature, structure, or characteristic following the phrase may be included in at least one embodiment of the present disclosure, or may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "image sensor" is referred to as a solid state device that is capable of generating electrical signals corresponding to the light signals that impinges on the image sensor. Some examples of the image sensor may include a color or monochrome 1D or 2D CCD, CMOS, NMOS, PMOS, CID CMD solid state image sensor or any other device, that may be capable to generating electrical signal based on the received light signals.

It is commonly understood that image capturing devices such as indicia readers or barcode scanners have an imaging unit that is capable of capturing and processing images. In some examples, the imaging unit may include a housing for one or more components such as one or more lenses (positioned in a lens barrel), an image sensor and a controller. In an example embodiment, the one or more components may operate in conjunction, to facilitate the image capturing device to capture and process an image of the object. For instance, the one or more lenses in the lens barrel may focus the light obtained from the object on the image sensor that, accordingly, generates electrical signals. The controller may, thereafter, process the electrical signals to render the captured image.

In some examples, an alignment between the lens barrel and the image sensor may govern the quality of the captured image. Misalignment between the lens barrel and the image sensor may lead to capturing of an out of focus image, which may be undesirable. In order to keep the lens barrel aligned with the image sensor, the housing of the imaging unit may define features such as grooves or flanges that may ensure that the lens barrel and the image sensor are aligned with each other. To this end, adhesive may be applied between the lens barrel and the housing to keep the lens barrel fixed at a position within the housing, thereby aligning the lens barrel with the image sensor. In some examples, curing of the adhesive causes the adhesive to shrink by few millimeters or micrometers. Such phenomena may modify the position of the lens barrel within the imaging unit, which may further lead to misalignment between the image sensor and the lens barrel.

The apparatuses described herein disclose an image capturing device that includes an imaging unit. The imaging unit further includes a cuboidal shaped housing (hereinafter referred to as housing) having a first sensor end portion and a scan window end portion. Further, the housing has an outer surface and an inner surface. The inner surface of the housing defines at least one lens channel. In some examples, the at least one lens channel has a cylindrical shape and extends from the first sensor end portion to the scan window end portion. Further, in some examples, the at least one lens channel may be sized to receive a lens barrel. For example, the at least one lens channel may be sized larger than lens barrel such that the lens barrel is seamlessly received in the at least one lens channel.

Further, the inner surface of the housing defines one or more contact points within the at least one lens channel. The one or more contact points may protrude out from the inner surface. Further, the one or more contact points may thwart the movement of the lens barrel within the lens channel. For example, the one or more contact points may thwart the movement of the lens barrel along a first central longitudinal axis of the lens channel. In an example embodiment, the central longitudinal axis may correspond to an axis that extends along a length of the lens channel. For example, the first central longitudinal axis may extend between the scan window end portion and first sensor end portion of the housing.

Additionally, the inner surface of the housing may define at least one glue pocket within the at least one lens channel. The at least one glue pocket may extend from the inner surface of the housing to the outer surface of the housing. In some examples, the at least one glue pocket may correspond to a through hole that extends from the inner surface of the housing to the outer surface of the housing. It is commonly understood that when a through hole is defined in a housing, one or more edge surfaces, defining a periphery of the through hole, are also created. Accordingly, a periphery of the at least one glue pocket may be defined by the one or more edge surfaces that may extend from the outer surface of the housing to the inner surface of the housing. In some examples, the one or more edge surfaces may define a shape of the at least one glue pocket. In one example embodiment, the at least one glue pocket may have an arcuate shape such that a first edge surface of the one or more edge surfaces is parallel to a second edge surface of the one or more edge surfaces. Further a third edge surface and a fourth edge surface of the one or more edge surfaces may have a semi-circular profile. For example, the third edge surface and the fourth edge surface may be C-shaped profile. In an example embodiment, the inner surface of the housing may define the at least one glue pocket in such manner that the first edge surface (of the one or more edge surfaces defining the periphery of the at least one glue pocket) may be positioned proximal to the first sensor end portion of the housing, while the second edge surface (of the one or more edge surfaces defining the periphery of the at least one glue pocket) may be positioned proximal to the scan window end portion of the housing.

In an example embodiment, the at least one glue pocket may be defined proximal to the scan window end portion of the housing such that the at least one glue pocket is defined between the scan end portion of the housing and the one or more contact points. Further, the one or more contact points are defined proximal to the first sensor end portion such that the one or more contact points are defined between the glue pocket and the first sensor end portion of the housing.

In an example embodiment, the at least one lens channel is configured to receive the lens barrel from the scan window end portion. In an example embodiment, the lens barrel may correspond to lens housing for one or more lenses. As discussed, the one or more lenses may be configured to focus the light received from the object onto an image sensor positioned at the first sensor end portion of the housing. In some examples, the lens barrel has a sensor end, a light receiving end, and an outer surface that extends between the sensor end of the lens barrel and the light receiving end of the lens barrel. The outer surface of the lens barrel defines a platform and a second sensor end portion. In an example embodiment, the platform protrudes out from the outer surface of the lens barrel and may circumferentially rotate about a second longitudinal central axis of the lens barrel. In an example embodiment, the second longitudinal central axis may correspond to an axis that extends between the sensor end and the light receiving end of the lens barrel. In an example embodiment, the platform may extend from the light receiving end to a junction between the platform and the second sensor end portion of the lens barrel. In an example embodiment, a radius of the platform is greater than a radius of the second sensor end portion. Accordingly, a step is defined at the junction between the first sensor end portion and the platform. In some examples, the step may have a predetermined pitch and a predetermined profile. In an example embodiment, the predetermined pitch may correspond to an angle between the step and a lateral axis of the lens barrel. In some examples, the predetermined profile may be indicative of a shape of the step as the step rotates about of the second central longitudinal axis. For example, the predetermined profile of the step may correspond to a shape of a sinusoidal wave. In some examples, when the lens barrel is received in the lens channel, the one or more contact points (defined in lens channel) may abut step, thereby thwarting the movement of the lens barrel along the first central longitudinal axis of the lens channel.

Additionally, the platform may define a groove that may circumferentially rotate about the second central longitudinal axis of the lens barrel. In some examples, the groove may correspond to a recess defined on the platform of the lens barrel. In some examples, the groove may have the same predetermined pitch as the pitch of the step. further, the groove may the same predetermined profile as the profile of the step. In some examples, when the step (defined on the lens barrel) abuts with the one or more contact points (defined in the lens channel), a portion of the groove may be exposed via the glue pocket. Since the predetermined profile of the groove is the same as the predetermined profile of the step, when the lens barrel is rotated within the lens channel while the one or more contact points abut the step, the portion of the groove (defined on the lens barrel) remains exposed through the glue pocket.

When glue is disposed on the groove through the glue pocket, the adhesive may get evenly distributed within the groove because the groove (defined on the lens barrel) has a fixed profile and the groove is exposed through the glue pocket. Accordingly, variations due to curing of the glue (e.g., movement of the lens barrel within lens channel due to curing of the glue) remain consistent during manufacturing of various imaging units. Therefore, any anticipated change in the focal point of the lens barrel (due to glue curing) can be compensated prior to the glue curing consistently across various imaging unit.

FIG. 1 illustrates a perspective view 100 of an image capturing device 102, according to one or more embodiments described herein. In an example embodiment, the image capturing device 102 may correspond to a barcode scanner that may be capable of scanning and reading machine readable codes such as a barcode, a QR code, 2D code, Datamatrix code, and/or the like. In some example, the image capturing device 102 may be further capable of reading and recognizing text from an image, without departing from the scope of the disclosure.

In an example embodiment, the image capturing device 102 may include a head portion 104, a handle portion 106, and a trigger button 108. In some examples, the head portion 104 may have an arcuate shape that has a scan window end 110 and a rear end 112. In an example embodiment, the scan window end 110 and the rear end 112 of the head portion 104 may be spaced apart from each other along a first lateral axis 118. In an example embodiment, the head portion 104 may define a scan window 114, at the scan window end 110 of the head portion 104. In an example embodiment, the scan window 114 may be configured to receive an imaging unit 116. In an example embodiment, the imaging unit 116 may include one or more components (e.g., processors, lenses, illumination devices, cameras, and/or the like) for performing scanning operations. The structure of the imaging unit 116 is further described in conjunction with FIGS. 2-6.

The handle portion 106 may extend out from the head portion 104 along a first longitudinal axis 120 of the image capturing device 102. In some examples, the trigger button 108 may be positioned on the handle portion 106. In some examples, the trigger button 108 may be positioned on the head portion 104, without departing from the scope of the disclosure.

By way of example, a user of the image capturing device 102 may point the image capturing device 102 in the direction of a target object such that the scan window end 110 is pointed towards the target object. The user may input a command (e.g., via the trigger button 108) and cause the imaging unit 116 to scan the target object. In some embodiments, the information gathered by the imaging unit 116 may be transmitted a host (not shown) over a communication network (not shown).

Figure 2:
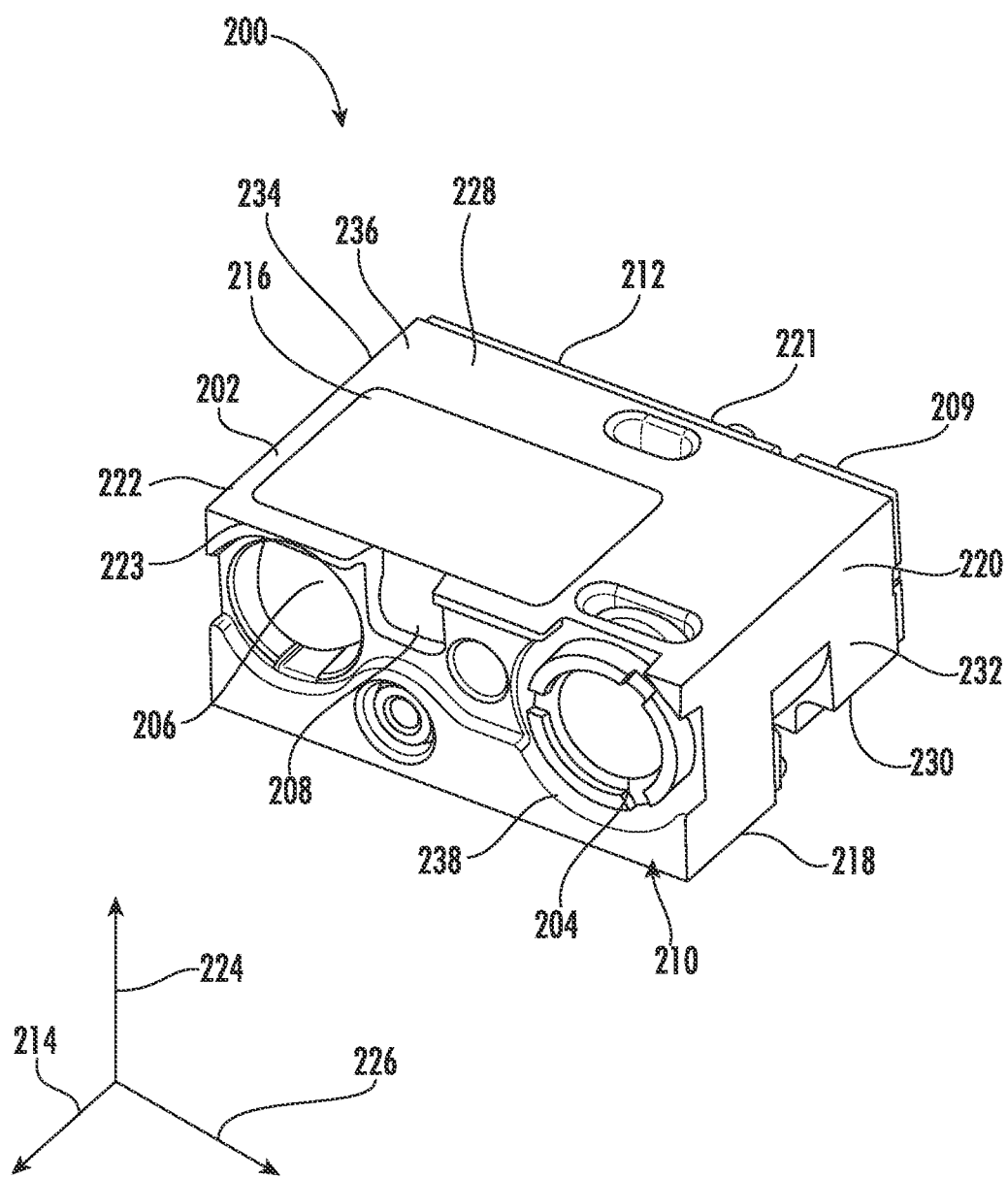
FIG. 2 illustrates a perspective view of an imaging unit, according to one or more embodiments described herein.
Figure 3:
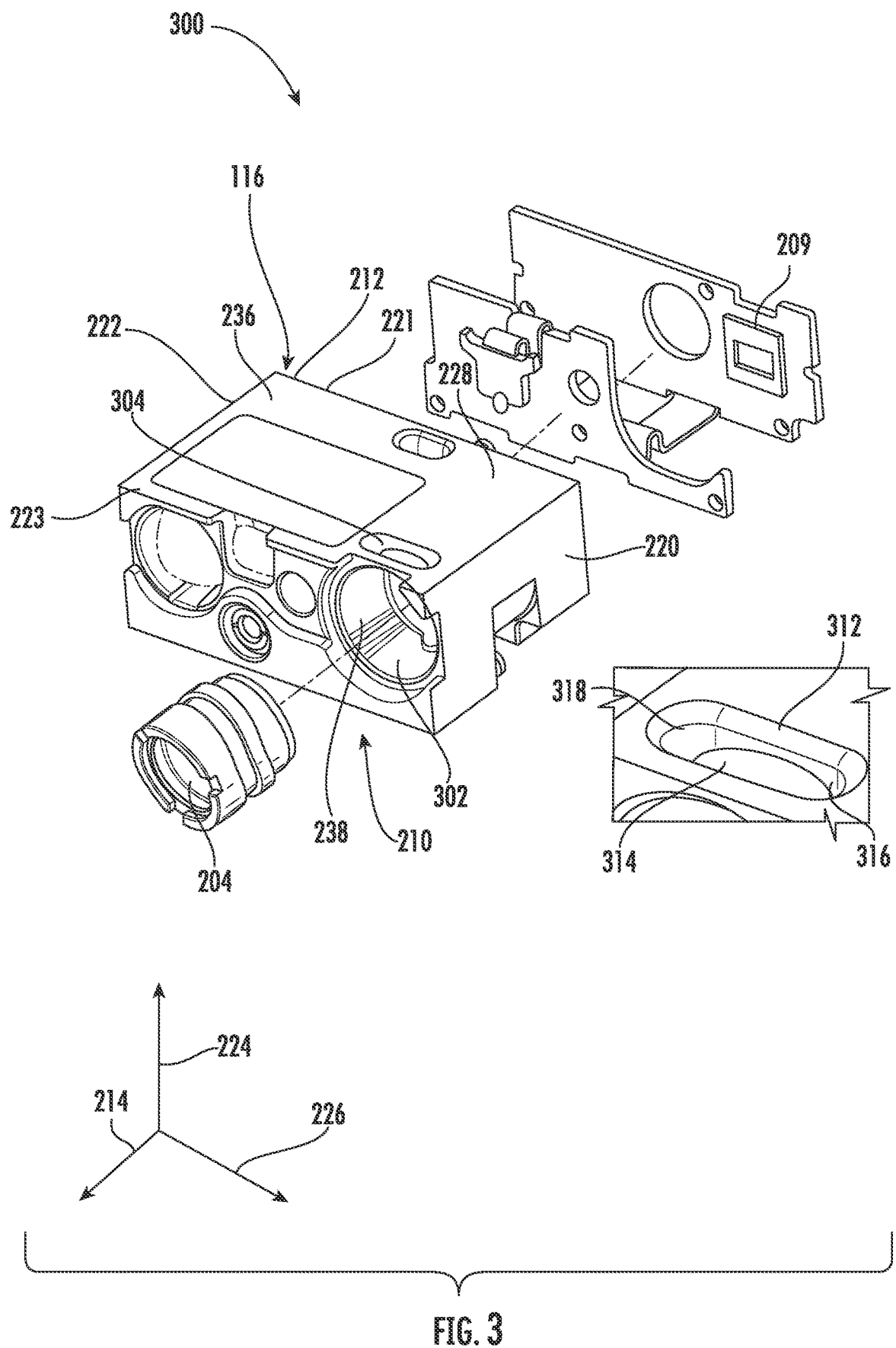
FIG. 3 illustrates an exploded view of the imaging unit, according to one or more embodiments described herein.

FIG. 2 and FIG. 3 illustrate a perspective view 200 and an exploded view 300 of the imaging unit 116, respectively, according to one or more embodiments described herein. Referring to FIG. 2, the imaging unit 116 includes a housing 202, a lens barrel 204, an illumination lens 206, an aiming lens assembly 208, and an image sensor 209.

The housing 202 of the imaging unit 116 corresponds to a cuboidal housing that includes a scan window end portion 210 and a first sensor end portion 212. In an example embodiment, the scan window end portion 210 may be spaced apart from the first sensor end portion 212 along a second lateral axis 214. The first sensor end portion 212 of the housing 202 may be configured to fixedly receive the image sensor 209. Further, the scan window end portion 210 of the housing 202 may be configured to be pointed towards the scan window end 110 of the head portion 104, in an instance in which the imaging unit 116 is received in the head portion 104 of the image capturing device 102.

Further, the housing 202 of the imaging unit 116 has a top portion 216, a bottom portion 218, a first side portion 220, and a second side portion 222. In an example embodiment, the bottom portion 218 is parallel to the top portion 216. Further, the bottom portion 218 and the top portion 216 are spaced apart from each other along a vertical axis 224. In some examples, the first side portion 220 is parallel to the second side portion 222. Further, the first side portion 220 and the second side portion 222 are spaced apart along a second longitudinal axis 226. In an example embodiment, the second lateral axis 214, the vertical axis 224, and the second longitudinal axis 226 are perpendicular to each other.

In some examples, the top portion 216 of the housing 202 has a top surface 228, while the bottom portion 218 has a bottom surface 230. Similarly, in some examples, the first side portion 220 and the second side portion 222 has a first side surface 232 and a second side surface 234, respectively. In an example embodiment, the top surface 228, the bottom surface 230, the first side surface 232, and a second side surface 234, together define an outer surface 236 of the housing 202. In some examples, the top surface 228 of the top portion 216 may define a first edge 223 and a second edge 221. The first edge 223 may be defined at the scan window end portion 210, while the second edge 221 may be defined at the first sensor end portion 212. In some examples, the first edge 223 may be parallel to the second edge 221.

Referring to FIG. 3, the housing 202 of the imaging unit 116 has an inner surface 238. The inner surface 238 of the housing 202 defines a lens channel 302 such that the lens channel 302 is positioned proximal to the first side portion 220 of the housing 202 and distal from the second side portion 222 of the housing 202. In an example embodiment, the lens channel 302 may extend between the scan window end portion 210 and the first sensor end portion 212, of the housing 202. In some examples, the lens channel 302 may have a cylindrical shape. Further, the lens channel 302 is sized to receive the lens barrel 204. For example, a radius of the lens channel 302 may be greater than the radius of the lens barrel 204 allowing the lens barrel 204 to be received within the lens channel 302.

Further, the inner surface 238 of the housing 202 defines a glue pocket 304 in the lens channel 302. In an example embodiment, the glue pocket 304 may correspond to a through hole that extends from the inner surface 238 of the housing 202 to the outer surface 236 of the housing 202. For example, in the lens channel 302, the glue pocket 304 extends from the inner surface 238 of the housing 202 to the top surface 228 (that constitutes the outer surface 236) of the housing 202.

In some examples, defining a glue pocket (e.g., the glue pocket 304) creates one or more edge surfaces in the housing 202 that may define a periphery of the glue pocket 304. The one or more edge surfaces may extend from the inner surface 238 of the housing 202 to the outer surface 236 of the housing 202. In an example embodiment, the one or more edge surfaces (defining the periphery of the glue pocket 304) includes a first edge surface 312, a second edge surface 314, a third edge surface 316, and a fourth edge surface 318.

In an example embodiment, the first edge surface 312 of the one or more edge surfaces (defining the periphery of the glue pocket 304) may be proximate to the first sensor end portion 212 of the housing 202, while the second edge surface 314 of the one or more edge surfaces (defining the periphery of the glue pocket 304) may be proximate to the scan window end portion 210 of the housing 202. Further, the first edge surface 312 of the one or more edge surfaces (defining the periphery of the glue pocket 304) is parallel to the second edge surface 314 of the one or more edge surfaces (defining the periphery of the glue pocket 304). Additionally or alternatively, the first edge surface 312 of the one or more edge surfaces is spaced apart from the second edge surface 314 along the second lateral axis 214 of the housing 202.

In some examples, the scope of the disclosure is not limited to the second edge surface 314 being parallel to the first edge surface 312. In an example embodiment, the first edge surface 312 may not be parallel to the second edge surface 314, without departing from the scope of the disclosure. Additionally or alternatively, the first edge surface 312 and the second edge surface 314 may be parallel to the first edge 223 and the second edge 221 of the housing 202.

In some examples, the third edge surface 316 of the one or more edge surfaces (defining the periphery of the glue pocket 304) may be parallel to the fourth edge surface 318. Further, the third edge surface 316 is spaced apart from the fourth edge surface 318 along the second longitudinal axis 226 of the housing 202. Furthermore, the third edge surface 316 may be proximal to the first side portion 220 of the housing 202, while the fourth edge surface 318 may be proximal to the second side portion 222 of the housing 202. In some examples, the scope of the disclosure is not limited to the third edge surface 316 being parallel to the fourth edge surface 318. In an example embodiment, the third edge surface 316 and the fourth edge surface 318 may have a C-shaped profile and inverted C-shaped profile, respectively. In some examples, the scope of the disclosure is not limited to the third edge surface 316 and the fourth edge surface 318 having the C-shaped profile and inverted C-shaped profile, respectively. In an example embodiment, the third edge surface 316 and the fourth edge surface 318 may have any other profile, without departing from the scope of the disclosure.

In an example embodiment, the inner surface 238 defines one or more contact points (further described in FIG. 4A and FIG. 4B) in the lens channel 302. The structure of the one or more contact points is further described in conjunction with FIG. 4A and FIG. 4B.

Figure 4A:
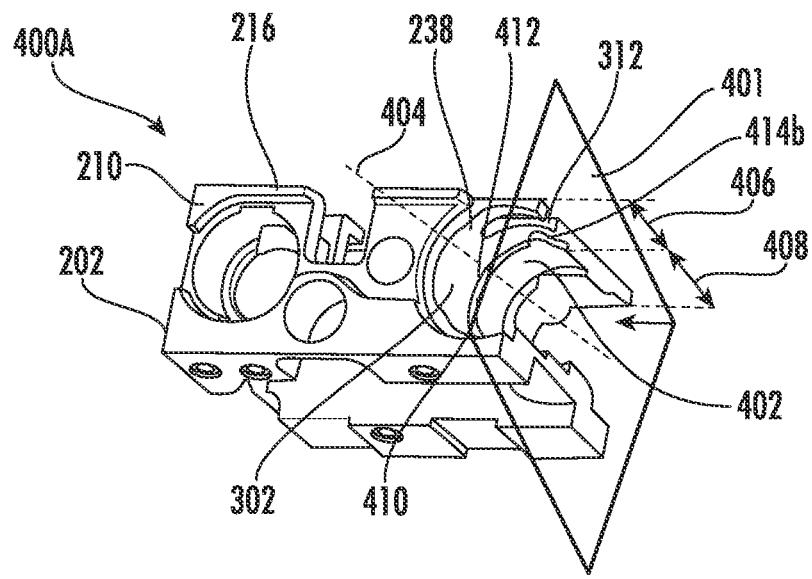
FIGS. 4A and 4B illustrate a sectional view a housing of the imaging unit, according to one or more embodiments described herein.
Figure 4B:
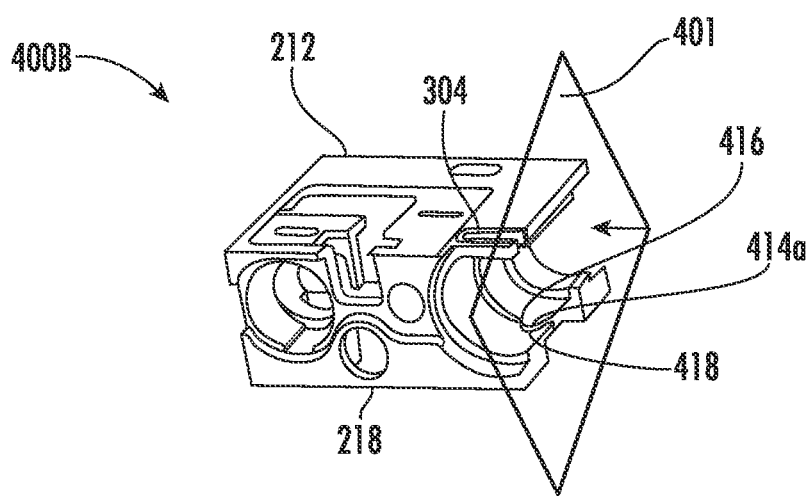
Figure 4B:
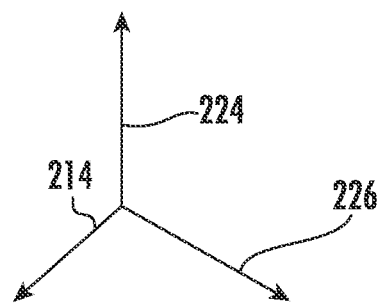

FIG. 4A and FIG. 4B illustrates sectional views 400A and 400B, respectively, of the housing 202 obtained when the housing 202 is cut by a first plane 401 passing through the glue pocket 304 along the vertical axis 224, according to one or more embodiments described herein. The sectional view 400A of the housing 202 illustrates that the inner surface 238 of the housing 202 defines a first platform 402. In an example embodiment, the first platform 402 may protrude out from the inner surface 238 of the housing 202 within the lens channel 302. Further, the first platform 402 rotates about a first central longitudinal axis 404 of the lens channel 302. In an example embodiment, the first platform 402 may divide the lens channel 302 into a lens receiving section 406 and a rear section 408. In an example embodiment, the lens receiving section 406 may correspond to a portion of the lens channel 302 that may be configured to receive the lens barrel 204 (refer FIG. 3). Additionally, the lens receiving section 406 may extend from the scan window end portion 210 to a junction 412 between the rear section 408 and the lens receiving section 406. In an example embodiment, the rear section 408 may correspond to portion of the lens channel 302 that may be proximal to the first sensor end portion 212 (refer FIG. 4B) of the housing 202. Further, the rear section 408 may extend from the junction 412 (between the rear section 408 to the lens receiving section 406) to the first sensor end portion 212 of the housing 202. Additionally, the rear section 408 may be composed of the first platform 402.

In an example embodiment, a radius of the rear section 408 is less than a radius of the lens receiving section 406. Accordingly, a first step 410 is defined at the junction 412 between the rear section 408 and the lens receiving section 406, as is observed from the scan window end portion 210 of the housing 202. Additionally or alternately, the inner surface 238 of the housing 202 may define the one or more contact points 414a and 414b (refer FIG. 4B). In an example embodiment, the one or more contact points 414a and 414b may extend out from the first step 410 in a direction towards the scan window end portion 210 of the housing 202 (i.e., along the first central longitudinal axis 404). Additionally or alternately, the one or more contact points 414 a (refer FIG. 4b) and 414b may protrude from the inner surface 238 of the housing 202. In some examples, the contact point 414a may be positioned opposite to the contact point 414b along the vertical axis 224 of the housing 202. For example, the contact point 414a may be defined proximal to the bottom portion 218 of the housing 202 and the contact point 414b may be defined proximal to the top portion 216 of the housing 202. In some examples, the structure and the dimensions of the contact point 414*a* may be similar to the structure and the dimensions of the contact point 414*b*.

In an example embodiment, the contact point 414*a* has a first end 416 and a second end 418. The first end 416 may be spaced apart from the second end 418 along the first central longitudinal axis 404. In an example embodiment, the second end 418 may be proximal to the scan window end portion of the 210 of the housing 202 and distal from the first sensor end portion 212 of the housing 202. The first end 416 of the contact point 414*a* may be coupled to the first platform 402. In an example embodiment, the first end 416 may be molded with the first platform 402 during manufacturing of the housing 202. In an example embodiment, the second end 418 of the contact point 414*a* may have a curved profile. For example, the second end 418 of the contact point 414*a* may have a semi-circular profile. In another embodiment, the second end 418 of the contact point 414*a* may have a conical profile. In some examples, the second end 418 of the contact point 414*a* may have any other profile without departing from the scope of the disclosure. The purpose of the profile of the second end 418 (of the one or more contact points 414*a* and 414*b*) is further described in conjunction with FIG. 6. In an example embodiment, the second end 418 of the one or more contact points 414*a* and 414*b* may be defined at a first predetermined distance from the first edge surface 312 defining the periphery of the glue pocket 304.

In some examples, the scope of the disclosure is not limited to the one or more contact points 414*a* and 414*b* extending out from the first platform 402. In an example embodiment, the one or more contact points 414*a* and 414*b* may be defined independent from the first platform 402. In such an embodiment, the lens channel 302 may be devoid of the first platform 402, without departing from the scope of the disclosure.

In some examples, the scope of the disclosure is not limited to having only two contact points (i.e., 414*a* and 414*b*). In an example embodiment, the inner surface 238 of the housing 202 may define more than two contact points 414*a* and 414*b*. For example, the inner surface 238 may define another contact point in the lens channel 302, where the other contact point is defined proximal to the first side portion 220 of the housing 202. Additionally, the inner surface 238 may define yet another contact point in the lens channel 302 that is proximal to the second side portion 222 of the housing 202.

In yet another embodiment, the lens channel 302 may not include any of the one or more contact points 414*a* and 414*b*. In such an embodiment, the lens channel 302 may only include the first platform 402. Further, to this end, the first step 410 (created due to difference in radius of the first platform 402 from the radius of the lens receiving section 406) may have a first predetermined profile. In an example embodiment, the first predetermined profile of the first step 410 may correspond to a shape of the first step 410, as the first step 410 rotates about the first central longitudinal axis 404. For example, the first step 410 may have a shape representing a sinusoidal wave. Accordingly, the first predetermined profile of the first step 410 may have a peak region and a valley region. In some examples, the first step 410 may have more than one peak regions and valley regions. Further, in such an embodiment, the functionality of the peak region may be similar to the functionality of the one or more contact points 414*a* and 414*b*.

Referring back to FIG. 3, the lens channel 302 is configured to receive the lens barrel 204. The structure the lens barrel 204 is further described in conjunction with FIG. 5A and FIG. 5B.

Figure 5A:
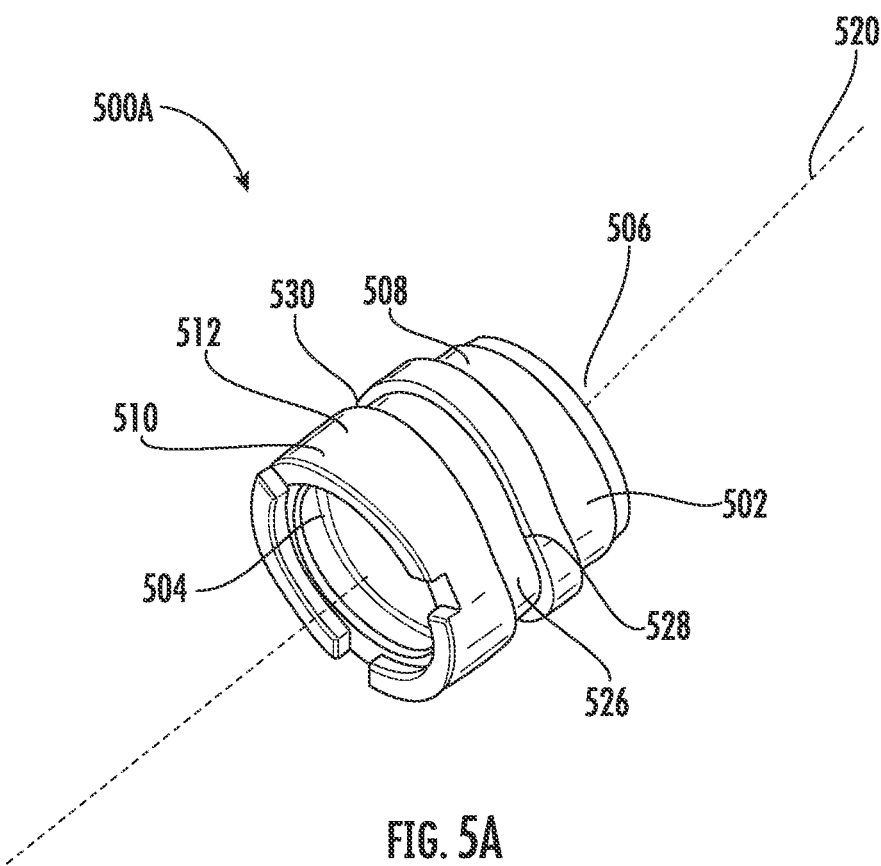
FIGS. 5A and 5B illustrate a perspective view and a side view of a first lens barrel, respectively, according to one or more embodiments described herein.
Figure 5B:
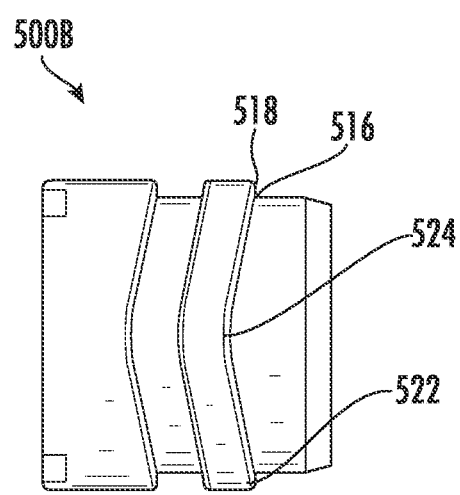

FIG. 5A and FIG. 5B illustrate a perspective view 500A and a side view 500B of the lens barrel 204, respectively, according to one or more embodiments described herein. Referring to FIG. 5A, the lens barrel 204 includes a lens housing 502 that may be configured to receive a lens assembly (not shown). The lens housing 502 may correspond to a cylindrical housing that has a light receiving end 504 and a sensor end 506. Further, the lens housing 502 has an outer surface 508 that extends between the light receiving end 504 and the sensor end 506. In an example embodiment, the light receiving end 504 of the lens housing 502 may be configured to receive the light from the object to be captured by the imaging unit 116. In some examples, the sensor end 506 of the lens housing 502 may face towards the image sensor 209 in the imaging unit 116 when the lens barrel 204 is received in the lens channel 302.

In an example embodiment, the outer surface 508 of the lens housing 502 defines a platform 510 and a first portion 512. In an example embodiment, the platform 510 of the lens housing 502 may extend between the light receiving end 504 and a junction 516 between the platform 510 and the first portion 512. Additionally or alternatively, the platform 510 may be defined to circumferentially rotate about a second central longitudinal axis 520 of the lens housing 502. In an example embodiment, the second central longitudinal axis 520 may extend between the light receiving end 504 and the sensor end 506 of the lens housing 502. In an example embodiment, the first portion 512 may extend between the sensor end 506 of the lens housing 502 and the junction 516 between the platform 510 and the first portion 512 of the lens housing 502. In an example embodiment, the radius of the platform 510 is greater than the radius of the first portion 512 of the lens housing 502. Accordingly, a second step 518 is defined at the junction 516 between the platform 510 and the first portion 512 of the lens housing 502. Since the platform 510 is defined to rotate about the second central longitudinal axis 520, the second step 518 may rotate about of the second central longitudinal axis 520 of the lens housing 502. In an example embodiment, the second step 518 may have a second predetermined profile and/or a second predetermined pitch. In an example embodiment, the second predetermined pitch may correspond to an angle between the second step 518 and the second lateral axis 214 of the housing 202. In an example embodiment, the second predetermined profile of the second step 518 may correspond to a shape of the second step 518, as the second step 518 rotates about the second central longitudinal axis 520. For example, the second step 518 may have a shape representing the sinusoidal wave. Accordingly, the second predetermined profile of the second step 518 may define a peak region 522 and a valley region 524 (refer FIG. 5B) on the second step 518 (as the second step 518 rotates about the second central longitudinal axis 520. In some examples, the scope of the disclosure is not limited to the second predetermined profile of the second step 518 defining one peak region 522 and one valley region 524. In an example embodiment, the second predetermined profile of the second step 518 may define more than one peak region and more than one valley region, without departing from the scope of the disclosure. In some examples, the scope of the disclosure is not limited to the second predetermined profile representing the sinusoidal wave. In an example embodiment, the second predetermined profile may correspond any other shape that defines one or more peak regions and one or more valley regions, without departing from the scope of the disclosure.

In an example embodiment, the outer surface 508 of the lens housing 502 may define a groove 526 in the platform 510. In some examples, the groove 526 main be defined to rotate circumferentially about the second central longitudinal axis 520 of the lens housing 502. In an example embodiment, defining the groove 526 may define a first edge 528 and a second edge 530, where the first edge 528 and the second edge 530 may define the periphery of the groove 526. In an example embodiment, the first edge 528 and the second edge 530 may rotate about the second central longitudinal axis 520 of the lens housing 502. In an example embodiment, the first edge 528 may be positioned proximal to the sensor end 506 and distal from the light receiving end 504 of the lens housing 502. Further, the second edge 530 may be positioned proximal to the light receiving end 504 and distal from the sensor end 506 of the lens housing 502. In some examples, the first edge 528 is defined at a second predetermined distance from the second step 518, along the second central longitudinal axis 520 of the lens housing 502. In an example embodiment, the second predetermined distance may be same as the first predetermined distance between the first end 416 of the one or more contact points 414a and 414b, and the first edge surface 312 defining the periphery of the glue pocket 304. In an example embodiment, the first edge 528 and the second edge 530 may be parallel and may have a third predetermined profile. In an example embodiment, the third predetermined profile of the first edge 528 and the second edge 530 may correspond to a shape of first edge 528 and the second edge 530, as the first edge 528 and the second edge 530 rotate about the second central longitudinal axis 520 of the lens housing 502. In an example embodiment, the third predetermined profile of the first edge 528 and the second edge 530 is same as the second predetermined profile of the second step 518. Accordingly, the first edge 528, the second edge 530, and the second step 518 may be parallel to each other. Since the first edge 528 and the second edge 530 define the periphery of the groove 526, the groove 526 may have the third predetermined profile. Accordingly, the groove 526 may be parallel to the second step 518.

In an embodiment, where the lens channel 302 is devoid of the one or more contact points 414a and 414b, the lens housing 502 may define the one or more contact points. For example, the outer surface 508 of the lens housing 502 may define the one or more second contact points that may protrude out from the outer surface 508 of the lens housing 502. Additionally, the one or more second contact points may extend out from the second step 518 along the second central longitudinal axis 520 of the lens housing 502. The structure of the one or more contact points may be similar to the one or more contact points 414a and 414b (defined in the lens channel 302). For example, the one or more second points may have a first end and a second end. The second end of the one or more second contact points may be at the second predetermined distance from the first edge 528 defining the periphery of the groove 526. Further, the second end of the one or more second contact points may be positioned proximal to the sensor end 506 of the lens housing 502. Further, the first end of the one or more second contact points may be coupled to the second step 518.

Further, to this end, the second step 518 (defined in the lens housing 502) may not have the second predetermined pitch. For example, the angle between the second step 518 and the second lateral axis 214 of the housing 202 (of the imaging unit 116) may be zero degrees. However, the groove 526 may have the third predetermined pitch.

In yet another embodiment, the lens housing 502 may not define specific features that may correspond to the one or more second contact points. Instead the peak region 522 defined by the second predetermined profile of the second step 518 may act as the one or more second contact points.

Referring back to FIG. 3 and FIG. 2, to assemble the imaging unit 116, the image sensor 209 is mounted at the first sensor end portion 212 of the housing 202. In some examples, the image sensor 209 is mounted at the first sensor end portion 212 such that the image sensor 209 aligns with the lens channel 302. Further, in an example embodiment, the lens channel 302 is configured to receive the lens barrel 204. In an instance in which the lens barrel 204 is received in the lens channel 302, the second end 418 of one or more contact points 414a and 414b (defined in the lens channel 302) slidably abuts the second step 518 (defined on the lens barrel 204). For example, the one or more contact points 414a and 414b may slide over the second step 518 when the lens barrel 204 is rotated within the lens channel 302 (while the second end 418 of the one or more contact points 414a and 414b abuts the second step 518). Additionally or alternatively, the abutment between the one or more contact points 414a and 414b, and the second step 518 may thwart the movement of the lens barrel 204 along the first central longitudinal axis 404 of the lens channel 302.

As discussed supra, the first predetermined distance between the first edge surface 312 (defining the periphery of the glue pocket 304) and the second end 418 of the one or more contact points 414a and 414b is same as the second predetermined distance between the second step 518 and the first edge 528 (defining the periphery of the groove 526). Therefore, the groove 526 is exposed through the glue pocket 304 when the second end 418 of the one or more contact points 414a and 414b abut the second step 518 (defined on the lens barrel 204). In an example embodiment, when the lens barrel 204 is rotated within the lens channel 302, the one or more contact points 414a and 414b may slide over the second step 518 based on the second predetermined profile of the second step 518. When the lens barrel 204 is rotated within the lens channel 302, the second predetermined profile corresponds to the shape of the sinusoidal wave, the one or more contact points 414a and 414b may slide over of the second step 518 in accordance with the sinusoidal wave. Therefore, during rotation of the lens barrel 204 within the lens channel 302, the lens barrel 204 may also move along the first central longitudinal axis 404. For example, a distance between the sensor end 506 of the lens barrel 204 and the image sensor 209 may be maximum when the one or more contact points 414a and 414b abut the peak region 522 on the second step 518. Further, the distance between the sensor end 506 of the lens barrel 204 and the image sensor 209 may be minimal when the one or more contact points 414a and 414b abut the valley region 524 on the second step 518. Such variations in the distance between the sensor end 506 of the lens barrel 204 and the image sensor 209 due to rotation of the lens barrel 204 within the lens channel 302 facilitates adjusting of the focal point of the lens barrel 204 during manufacturing of the imaging unit 116.

As discussed in FIG. 4A and FIG. 4B, the one or more contact points 414a and 414b are in the same plane, therefore, the one or more contact points 414a and 414b (at any position of the lens barrel 204 within the lens channel 302) may abut two separate points on the second step 518. In an example embodiment, the two separate points may have same phase and same amplitude with response to sinusoidal wave profile. For example, if the contact point 414a abuts the peak region 522 of the second step 518, the contact point 414b may also abut the other peak region in the second step 518. In an example embodiment, as discussed above, the second predetermined profile of the second step 518 may define more than one peak region, Accordingly, the contact point 414b may abut the other peak region in the second step. In another example, if the contact point 414a abuts the valley region 524 of the second step 518, the contact point 414b may also abut the other valley region in the second step 518.

Referring to FIGS. 5A and 5B, as discussed, in some examples, the scope of the disclosure is not limited to the one or more contact points 414a and 414b defined in the lens channel 302. In an example embodiment, the one or more second contact points may be defined on the lens barrel 204 and the lens channel 302 may be devoid of the one or more contact points 414a and 414b. Further, to this end, the first step 410 may have the first predetermined profile and the second step 518 may not have any profile. Accordingly, the one or more second contact points may slide over the first step 410 to adjust the distance between the image sensor 209 and the lens barrel 204. Since the first predetermined profile of the first step 410 is same as the third predetermined profile of the groove 526, the groove 526 may remain exposed through the glue pocket 304 when the lens barrel 204 is rotated within the lens channel 302.

In yet another embodiment, when both the lens barrel 204 and the lens channel 302 is devoid of the one or more second contact points and the one or more contact points 414a and 414b, the first step 410 may directly abut the second step 518. The first predetermined profile and the second predetermined profile of the first step 410 and the second step 518 may allow the lens barrel 204 to rotate within the lens channel 302 to adjust the distance between the lens barrel 204 and the image sensor 209. Further, when the first step 410 abuts the second step 518, the groove 526 remain exposed via the glue pocket 304.

Figure 6:
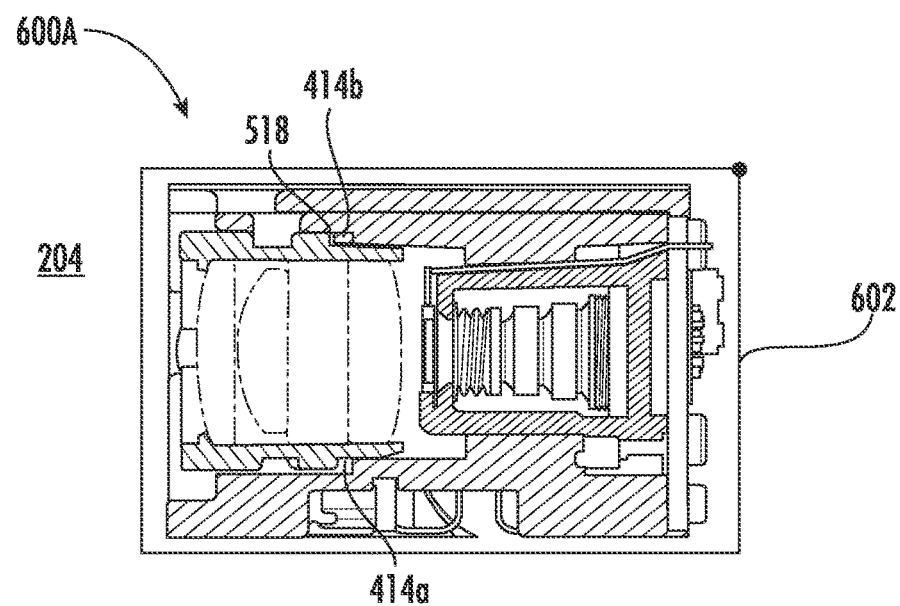
FIG. 6 illustrate a sectional views of the assembled imaging unit according to one or more embodiments described herein.
Figure 6:
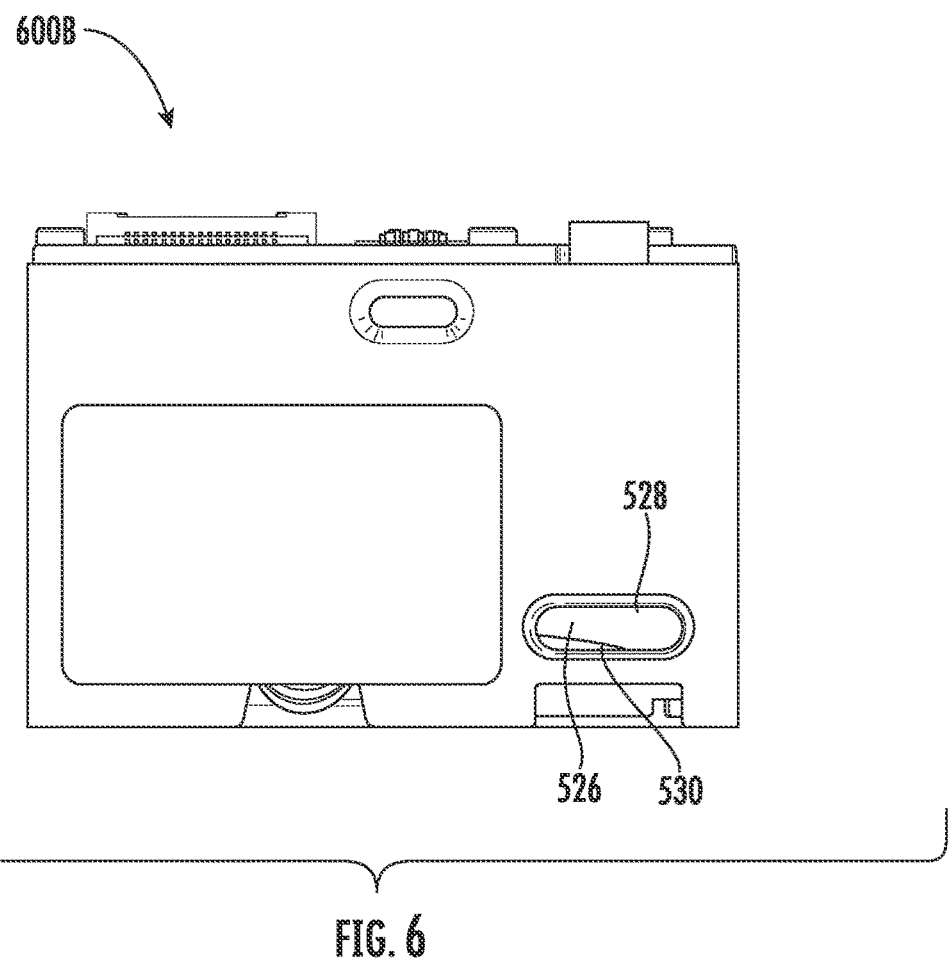

FIG. 6 illustrate a sectional view 600A and top view 600B of an assembled imaging unit 116 when a plane 602 intersects the imaging unit 116, according to one or more embodiments described herein.

As observed from the sectional view 600A, the one or more contact points 414a and 414b abut the second step 518 defined on the lens barrel 204. Further, it can be observed that the groove 526 is exposed via the glue pocket 304 (refer FIG. 6). In an example embodiment, when the glue is disposed through the glue pocket 304, the glue may seep in the groove 526 and may distribute uniformly within the groove 526. Since the first edge 528 and the second edge 530 of the groove 526 define the periphery of the groove 526, the first edge 528 and the second edge 530 may not allow the glue of spill out from the groove 526.

Figure 7:
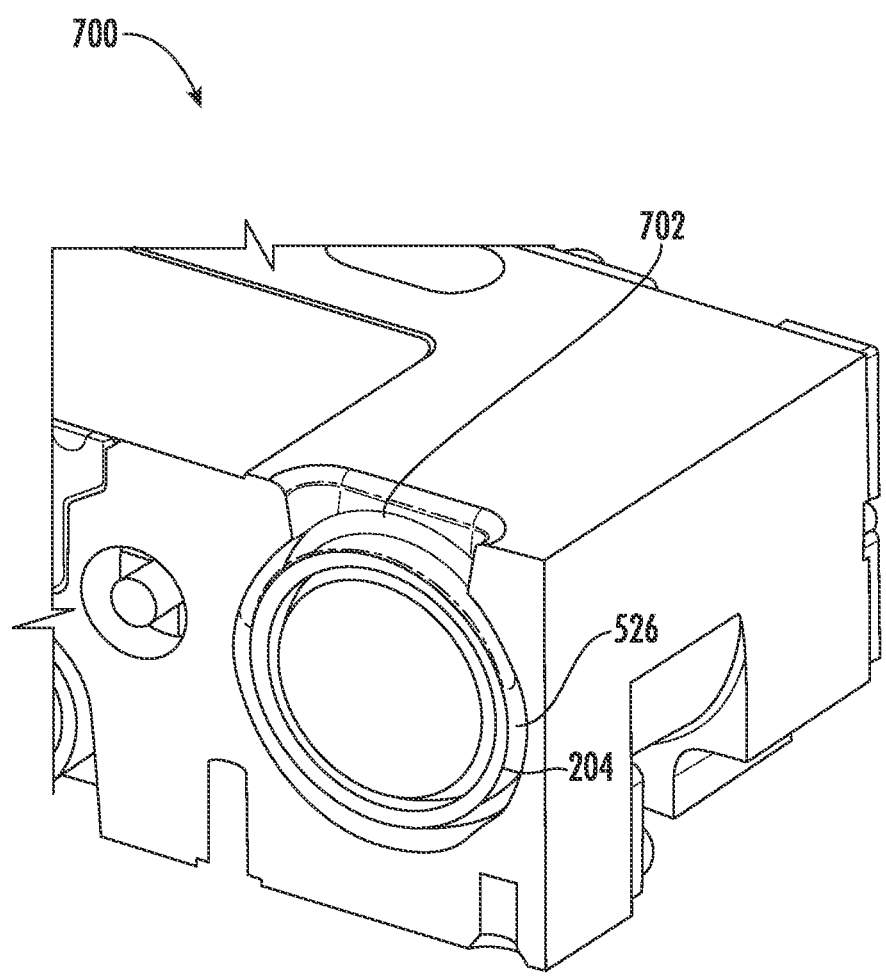
FIG. 7 illustrates another sectional view of the imaging unit, according to one or more embodiments described herein.

FIG. 7 illustrates another sectional view 700 of the assembled imaging unit 116 according to one or more embodiments described herein. As depicted in the sectional view 700, the glue 702 is uniformly distributed within the groove 526. In an example embodiment, after the curing of the glue, the glue may tightly couple the housing 202 with the lens barrel 204. Since the groove 526 on the lens barrel 204 is of fixed size, an amount of glue to be disposed remains constant across the various imaging units as well. Accordingly, variations due to curing of the glue (e.g., movement of the lens barrel within lens channel due to curing of the glue) remain consistent during manufacturing of various imaging units. Therefore, any anticipated change in focal point of the lens barrel 204 can be compensated prior to curing of the glue.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the image capturing device. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. An image capturing device comprising:
an imaging unit comprising:
a housing that comprises an inner surface, wherein the inner surface of the housing defines a lens channel, wherein the inner surface of the lens channel defines:
a contact point that protrudes outwardly from the inner surface into the lens channel, and
a through hole, in the lens channel, which extends from the inner surface of the lens channel to an outer surface of the housing, wherein the through hole is extended perpendicular to a first central longitudinal axis of a lens barrel; and
the lens barrel received in the lens channel, the lens barrel comprising an outer surface that defines:
a first portion,
a first platform that circumferentially rotates about the first central longitudinal axis of the lens barrel, wherein a first step is defined at a junction between the first platform and the first portion,
a groove defined on the first platform, wherein the groove circumferentially rotates about the first central longitudinal axis of the lens barrel, wherein when the first step abuts the contact point, the groove is exposed via the through hole.

2. The image capturing device of claim 1, wherein defining the groove creates a first edge and a second edge in the first platform, wherein the first edge and the second edge define a periphery of the groove, and wherein the first edge and the second edge has a second predetermined profile.

3. The image capturing device of claim 1, wherein a periphery of the through hole is defined by at least a first edge surface, a second edge surface, a third edge surface and a fourth edge surface, and wherein the first edge surface is positioned at a first distance from the contact point, along a second central longitudinal axis of the lens channel.

4. The image capturing device of claim 3, wherein the first step is positioned at a second distance from a first edge in the first platform, defining the periphery of the groove, along the first central longitudinal axis of the lens barrel, wherein the first distance is same as the second distance.

5. The image capturing device of claim 1, wherein the inner surface of the housing defines a second platform and a lens receiving section within the lens channel, wherein a radius of the lens receiving section is greater than the radius of the second platform, and wherein a second step is defined at a junction between the lens receiving section and the second platform.

6. The image capturing device of claim 5, wherein the inner surface of the housing defines the contact point to extend out from the second step.

7. The image capturing device of claim 1, wherein the lens barrel is rotatably received within the lens channel, wherein the contact point is slidable on the first step when the lens barrel is rotated within the lens channel.

8. The image capturing device of claim 3, wherein the groove remains exposed via the through hole while the lens barrel is rotated within the lens channel.

9. The image capturing device of claim 1, wherein the through hole is configured to receive glue for fixedly coupling the lens barrel to the housing.

10. A housing of an imaging unit, the housing comprising:
an outer surface and an inner surface, wherein the inner surface of the housing defines:
a lens channel, wherein the inner surface of the lens channel defines:
a contact point that protrudes outwardly from the inner surface into the lens channel, and
a through hole, in the lens channel, that extends from the inner surface of the lens channel to the outer surface of the housing, wherein the through hole is extended perpendicular to a first central longitudinal axis of a lens barrel,
wherein the lens channel is configured to receive the lens barrel comprising a groove, wherein the groove is exposed to the through hole when the lens barrel is received in the lens channel.

11. The housing of the imaging unit of claim 10, wherein the inner surface of the housing defines a first platform and a lens receiving section within the lens channel, wherein a radius of the lens receiving section is greater than the radius of the first platform, and wherein a first step is defined at a junction between the lens receiving section and the first platform.

12. The housing of the imaging unit of claim 11, wherein the inner surface of the housing defines the contact point to extend out from the first step.

13. The housing of the imaging unit of claim 10, wherein the lens barrel is rotatably received within the lens channel, wherein the contact point is slidable on a second step defined on the lens barrel, when the lens barrel is rotated within the lens channel.

14. The housing of the imaging unit of claim 10, wherein a periphery of the through hole is defined by at least a first edge surface, a second edge surface, a third edge surface and a fourth edge surface, and wherein the first edge surface is positioned at a first distance from the contact point, along the first central longitudinal axis of the lens channel.

15. A lens barrel comprising:
a housing having an outer surface, wherein the outer surface defines:
a first portion,
a first platform that circumferentially rotates about a first central longitudinal axis of the lens barrel, wherein a first step is defined at a junction between the first platform and the first portion,
a groove defined on the first platform, wherein the groove circumferentially rotates about the first central longitudinal axis of the lens barrel,
wherein when the first step abuts a contact point defined in a lens channel in an imaging unit, the groove is exposed via a through hole defined in the imaging unit, wherein the through hole is extended perpendicular to the first central longitudinal axis of the lens barrel.

16. The lens barrel of claim 15, wherein defining the groove creates a first edge and a second edge in the first platform, wherein the first edge and the second edge define a periphery of the groove, and wherein the first edge and the second edge has a second predetermined profile.

17. The lens barrel of claim 16, wherein the through hole is defined at a first distance from the contact point in the imaging unit, wherein the first step is positioned at a second distance from the first edge, defining the periphery of the groove, along the first central longitudinal axis of the lens barrel, wherein the first distance is same as the second distance.

18. The lens barrel of claim 15, wherein the lens barrel is rotatably received within the lens channel, wherein the contact point is slidable on the first step when the lens barrel is rotated within the lens channel.

19. The lens barrel of claim 18, wherein the groove remains exposed via the through hole while the lens barrel is rotated within the lens channel.

20. The lens barrel of claim 1, wherein the first step has a first predetermined profile as the first step rotates about of the first central longitudinal axis of the lens barrel.

* * * * *